United States Patent
Kang

(10) Patent No.: US 8,432,580 B2
(45) Date of Patent: Apr. 30, 2013

(54) ERROR DIFFUSION PROCESSING METHOD AND APPARATUS

(75) Inventor: Ki-min Kang, Seongnam-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1678 days.

(21) Appl. No.: 11/280,277

(22) Filed: Nov. 17, 2005

(65) Prior Publication Data

US 2006/0126958 A1    Jun. 15, 2006

(30) Foreign Application Priority Data

Dec. 14, 2004    (KR) .................. 10-2004-0105668

(51) Int. Cl.
*H04N 1/40* (2006.01)
*H04N 1/405* (2006.01)
*G06K 15/00* (2006.01)

(52) U.S. Cl.
USPC .................. 358/3.03; 358/3.02; 358/3.04

(58) Field of Classification Search ............... 358/1.1, 358/1.9, 3.01, 3.03, 3.06; 382/252
See application file for complete search history.

(56) References Cited

U.S. PATENT DOCUMENTS

| | | | | |
|---|---|---|---|---|
| 4,701,811 A * | 10/1987 | Moriguchi et al. | ............. | 358/3.1 |
| 6,614,556 B1 * | 9/2003 | Hong et al. | .................. | 358/3.03 |
| 7,203,376 B2 * | 4/2007 | Takahashi et al. | ............. | 382/252 |
| 2001/0019632 A1 * | 9/2001 | Shibaki et al. | ................ | 382/252 |
| 2003/0218778 A1 * | 11/2003 | Ohta | ............................ | 358/3.04 |
| 2005/0017999 A1 * | 1/2005 | Yoshida | ............................ | 347/6 |

FOREIGN PATENT DOCUMENTS

| | | |
|---|---|---|
| JP | 2001-315319 | 11/2001 |
| JP | 2002-252764 | 9/2002 |
| JP | 2004-40303 | 2/2004 |

OTHER PUBLICATIONS

Reiner Eschbach, "Pixel-Based Error-Diffusion Algorithm for Producing Clustered Halftone Dots," vol. 3, No. 2; pp. 198-202; Apr. 1994 (Journal of Electronic Imaging, Spie + ISBT, US) XP000452075.*

* cited by examiner

*Primary Examiner* — Ming Hon
(74) *Attorney, Agent, or Firm* — Stanzione & Kim, LLP

(57) ABSTRACT

An error diffusion processing method and apparatus quantizes an input grayscale value of a pixel (m, n) of an input image based on a determination of whether the input grayscale value belongs to one of ranges divided by a plurality of thresholds. The ranges include at least one shadow area which is darker than a median grayscale value, and the input grayscale value is quantized to a predetermined grayscale value which is brighter than the median grayscale value in a predetermined method and thereby a binary grayscale value of the pixel (m, n) is determined. The error diffusion processing method and apparatus obtains an error from the input grayscale value and the binary grayscale value of the pixel (m, n), and distributes the error to neighboring pixels of the pixel (m, n) according to a predetermined error diffusion coefficient and modifies input grayscale values of the neighboring pixels. Therefore, an undesirable shadow area appearing due to the overlapping of toner particles can be prevented, and also an image similar to the input image in grayscale level can be obtained.

16 Claims, 11 Drawing Sheets

FIG. 6

|  |  |  |
|---|---|---|
|  | * | 7/16 |
| 3/16 | 5/16 | 1/16 |

ERROR DIFFUSION PROCESSING METHOD AND APPARATUS

CROSS-REFERENCE TO RELATED APPLICATIONS

This application claims priority from Korean Patent Application No. 2004-105668, filed on Dec. 14, 2004, in the Korean Intellectual Property Office, the disclosure of which are incorporated herein by reference.

BACKGROUND OF THE INVENTION

1. Field of the Invention

The present general inventive concept relates to an error diffusion processing method and apparatus. More particularly, the present general inventive concept relates to an error diffusion processing apparatus which quantizes an input grayscale value of at least one shadow area which is darker than a median grayscale value to a grayscale value which is brighter than the median grayscale value, a method thereof, and an image forming apparatus using the same.

2. Description of the Related Art

Image forming apparatuses, such as digital printers, fax machines, photocopiers and multifunction peripherals, realize an image through a plurality of pixels. In a case of printers adopting an electrophotographic developing method, the image is realized in a manner that toner particles are attracted by electric charges which are applied to an organic photoconductive (OPC) drum by pixel, and then toner images are transferred to paper as the image. An amount of the toner particles to be attracted to each pixel differs depending on a distribution or a level of the electric charges applied to the OPC by pixel, and accordingly, a gray-scale image is displayed.

In order to realize the image through the image forming apparatuses, a process is required to quantize an input grayscale value of a continuous-tone input image ranging from '0' to '255' to a binary grayscale value which is displayable by the image forming apparatus and thereby converts the input image to a binary-valued image. As a method for converting the input image to the binary-valued image, an error diffusion processing method has been suggested. Here, a grayscale value '0' represents black and a grayscale value '255' represents white.

In the error diffusion processing method, an error occurs in the process of converting the input image to the binary-valued image and is distributed to neighboring pixels, so that an average error of the binary-valued image is minimized. Therefore, the error diffusion processing method has advantages in that a reproducibility of the input image is improved and boundary artifacts are reduced.

The following equation 1 represents an algorithm for the error diffusion processing method which quantizes the input grayscale value of the input image to the binary grayscale value which is displayable by the image forming apparatus and thereby converts the input image into the binary-valued image.

$$e(m, n) = u(m, n) - b(m, n) \quad \text{[Equation 1]}$$

$$u(m, n) = x(m, n) + \sum_{(k,l) \in R} e(m-k, n-1) \times w(k, l)$$

if $b_1 < u(m, n) \leq b_0$, $b(m, n) = \begin{cases} b_0 & \text{if } u(m, n) \geq T_1 \\ b_1 & \text{else} \end{cases}$ if $b_2 < u(m, n) \leq b_1$, $b(m, n) = \begin{cases} b_1 & \text{if } u(m, n) \geq T_2 \\ b_2 & \text{else} \end{cases}$ if $b_{j-1} < u(m, n) \leq b_{j-2}$, $b(m, n) = \begin{cases} b_{j-2} & \text{if } u(m, n) \geq T_{j-1} \\ b_{j-1} & \text{else} \end{cases}$ where 'x(m, n)' denotes an input grayscale value of a pixel (m, n) of an input image, and 'b(m, n)' denotes a binary grayscale value which is obtained by quantizing the input grayscale value of the pixel (m, n). 'e(m, n)' denotes an error between the input grayscale value and the binary grayscale value of the pixel (m, n). 'u(m, n)' denotes a modified input grayscale value of the pixel (m, n).

The error is propagated to the neighboring pixels according to an error diffusion coefficient 'w(k, 1)', and the modified input grayscale value 'u(m, n)' is quantized based on a range divided by thresholds $T_1 \sim T_{j-1}$ and converted to the binary grayscale value 'b(m, n)'. For example, a binary-level halftoning is performed in a manner that if the modified input grayscale value is greater than a threshold 128, the binary grayscale value 'b(m, n)' is set to 255, and if the modified input gray value is not greater than the threshold 128, the binary grayscale value 'b(m, n)' is set to 0. If two thresholds are used to divide a quantization range into 3 or more, a multi-level halftoning can be used.

FIGS. 1A to 1G are views illustrating binary-valued images which are processed according to a conventional error diffusion processing method using the equation 1 and produced by a laser printer.

FIGS. 1A to 1C illustrate images which are realized under an ideal condition, whereas FIGS. 1D to 1F show images which are realized under a real condition.

FIG. 1A illustrates data about a binary-valued image which is scanned onto an organic photoconductive (OPC) drum of the laser printer, FIG. 1B illustrates an electric charge formed on the OPC drum, corresponding to the binary-valued image of FIG. 1A, and FIG. 1C illustrates an image which is printed on paper.

FIG. 1D shows data about a binary-valued image which is scanned onto the OPC drum of the laser printer, FIG. 1E illustrates an electric charge which is actually formed on the OPC drum, corresponding to the binary-valued image of FIG. 1D, and FIG. 1F illustrates an image which is actually printed on paper. As shown in FIG. 1E, when a laser beam is scanned onto a pixel of an image to express the pixel with a black dot corresponding to a grayscale value '0', neighboring pixels are unintentionally subjected to the energy of the laser beam. As shown in FIG. 1F, one of the neighboring pixels which intends to be expressed with a white dot corresponding to a grayscale value '255' is modified or changed to be expressed in a median grayscale level because excessive toner particles are attracted to the pixel due to the energy applied to the neighboring pixels.

FIG. 1G shows one example of an image which is actually realized through the laser beam described in FIGS. 1D to 1F.

Referring to FIG. 1G, two black dots are shown on paper, and undesirable toner particles are attracted to neighboring pixels around the black dots due to the energy of the laser beam applied to the pixels of the black dots. For example, the toner particles are attracted to a pixel A due to the overlapping of the energies of the laser beams applied the two black dots, and thus, the pixel A is expressed in an undesirable grayscale level.

FIGS. 2A to 2C are view illustrating a 3-level binary-valued image which is processed according to a conventional error diffusion processing method using the above-described equation 1.

FIG. 2A illustrates data about a 3-level binary-valued image which is scanned onto an OPC drum of the laser printer, and FIG. 2B illustrates an electric charge which is actually formed on the OPC corresponding to the 3-level binary-valued image of FIG. 2A.

FIG. 2C illustrates an example of an image which is actually realized on paper through laser beams of FIGS. 2A to 2B. Referring to FIG. 2C, a pixel B, which is to be expressed in a median grayscale value '128', appears nearly black because toner particles of the pixel B are overlapped with toner particles of neighboring pixels due the energy of the laser beams.

FIGS. 3A to 3D are views illustrating continuous-tone images having grayscale value from '255' to '0' and binary-valued images which are processed according to a conventional error diffusion processing method using the equation 1.

FIG. 3A illustrates a continuous-tone image which has grayscale values from '255' to '128'. FIG. 3B illustrates a continuous-tone image which has grayscale values from '128' to '0'. FIGS. 3C and 3D illustrate images which are obtained by processing the input image of FIGS. 3A and 3B to 3-level images of grayscale values '0', '128', and '255' according to the error diffusion method using the above-described equation 1.

Referring to FIGS. 3A to 3D, if an area is brighter than a median grayscale value '128', the area is expressed by a combination of a white dot corresponding to the grayscale value '255' and a half dot corresponding to the grayscale value '128' as shown in FIG. 3C. If an area is darker than the median grayscale value '128', the area is expressed by a combination of a black dot corresponding to the grayscale value '0' and the half dot corresponding to the grayscale value '128' as shown in FIG. 3D.

However, a shadow area of FIG. 3D, which is expressed by the combination of grayscale values '0' and '128' and is darker than the median grayscale value, is not expressed using a median level of grayscale but only a black level of grayscale due to the overlapping of laser beam energies of the neighboring pixels.

SUMMARY OF THE INVENTION

The present general inventive concept provides an error diffusion processing apparatus and method capable of solving a problem in that in a shadow area which is darker than a median grayscale value of an input image, the median level of grayscale is not expressed but only a nearly black level of grayscale is expressed, and an image forming apparatus using the same.

Additional aspects and advantages of the present general inventive concept will be set forth in part in the description which follows and, in part, will be obvious from the description, or may be learned by practice of the general inventive concept.

The foregoing and/or other aspects of the present general inventive concept may be achieved by providing an error diffusion processing method, comprising quantizing an input grayscale value of a pixel (m, n) of an input image based on a determination of whether the pixel belongs to one of areas divided by a number of thresholds, the area including at least one shadow area which is darker than a median grayscale value, the input grayscale value being quantized to a predetermined grayscale value which is brighter than the median grayscale value to determine a binary grayscale value of the pixel (m, n), obtaining an error from the input grayscale value and the binary grayscale value of the pixel (m, n), and distributing the error to neighboring pixels of the pixel (m, n) according to a predetermined error diffusion coefficient corresponding to the error to modify input grayscale values of the neighboring pixels.

The foregoing and/or other aspects of the present general inventive concept may also be achieved by providing an error diffusion processing apparatus comprising an adding unit to add an input grayscale value of a pixel (m, n) of an input image to errors which are distributed with respect to the pixel (m, n) according to a predetermined error diffusion coefficient, and to modify the input grayscale value of the pixel (m, n), an quantization unit to quantize an input grayscale value of a pixel of an input image based on a determination of whether the pixel belongs to one of areas divided by a number of thresholds, the area including at least one shadow area which is darker than a median grayscale value, the modified input grayscale value being quantized to a grayscale value which is brighter than the median grayscale value to determine a binary grayscale value of the pixel (m, n), a subtracting unit to obtain an error from the modified input grayscale value and the binary grayscale value of the pixel (m, n), and an error diffusion filter to distribute the error obtained by the subtracting unit to neighboring pixels of the pixel (m, n) according to a predetermined error diffusion coefficient corresponding to the error.

The foregoing and/or other aspects of the present general inventive concept may also be achieved by providing an error diffusion processing apparatus usable with an image forming apparatus, the error diffusion processing apparatus comprising an quantization unit to receive an input grayscale value of a pixel of an input image, to determine whether the received input grayscale value belongs to one of the areas divided by a plurality of thresholds corresponding to the entire grayscale values, and to quantize the received input grayscale value according to the determination to obtain a binary grayscale value representing that the pixel is expressed with a combination of a first number of one or more white dots, a second number of one or more black dots, and a third number of one or more half dots.

The foregoing and/or other aspects of the present general inventive concept may also be achieved by providing an image forming apparatus comprising a signal source to generate an image signal having a first pixel and a second pixel disposed adjacent to the first pixel, and an error diffusion processing apparatus having an quantization unit to receive a first input grayscale value of the first pixel, to determine whether the received input grayscale value belongs to one of the areas divided by a plurality of thresholds corresponding to the entire grayscale values, and to quantize the received input grayscale value according to the determination to obtain a binary grayscale value representing that the pixel is expressed with a combination of a first number of one or more white dots, a second number of one or more black dots, and a third number of one or more half dots.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 6 is a view illustrating a Floyd-Steinberg error filter; and

DETAILED DESCRIPTION OF THE PREFERRED EMBODIMENTS

Figure 1A:
FIGS. 1A to 1G are views illustrating binary-valued images which are processed in a conventional error diffusion processing method and produced through a laser printer.
Figure 1B:
Figure 1C:
Figure 1D:
Figure 1E:
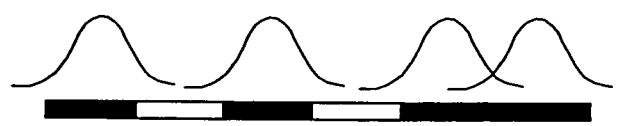
Figure 1F:
Figure 1G:
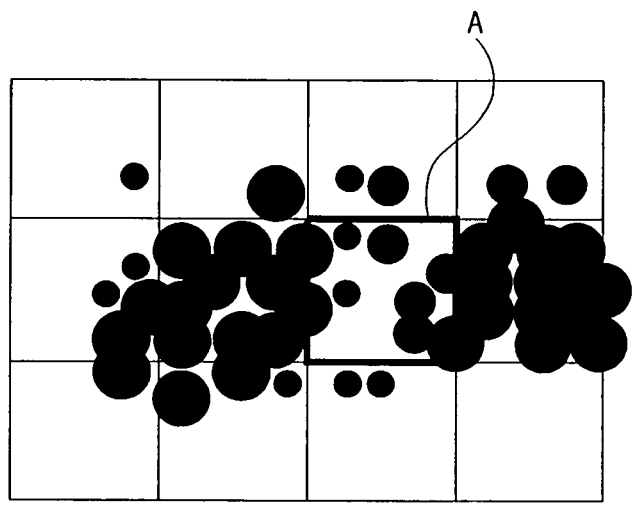
Figure 2A:
FIGS. 2A to 2C are views illustrating a 3-level binary-valued image which is processed in a conventional error diffusion processing method and is printed on paper.
Figure 2B:
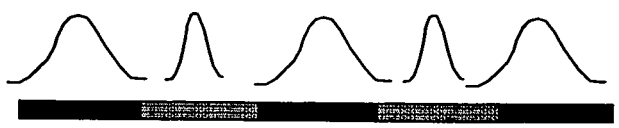
Figure 2C:
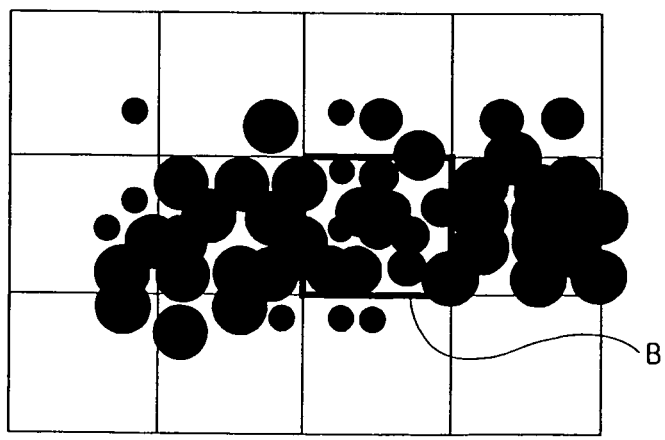
Figure 3A:
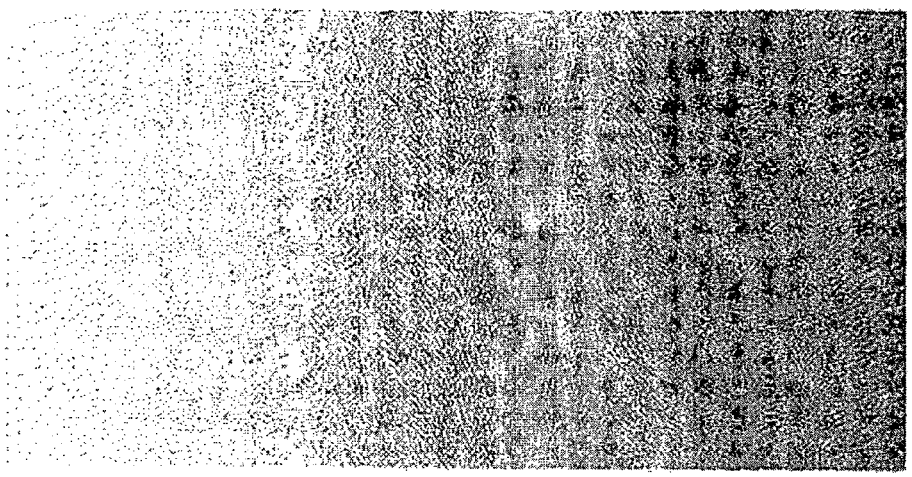
FIGS. 3A to 3D are views illustrating continuous-tone images having grayscale values from '255' to '0' and binary-valued images which are obtained by processing the continuous-tone images according to a conventional error diffusion method.
Figure 3B:
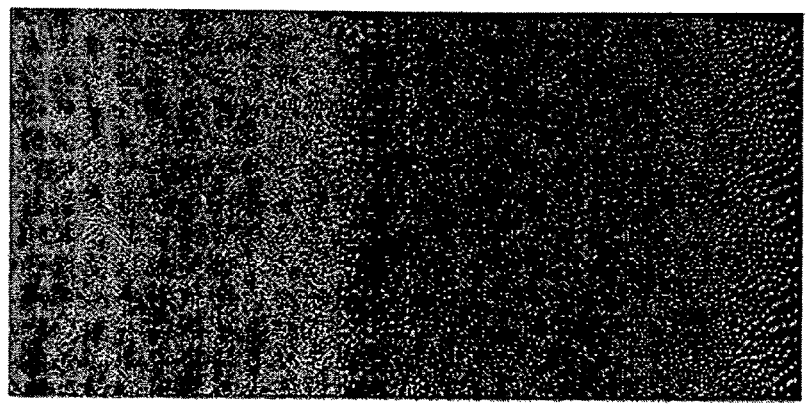
Figure 3C:
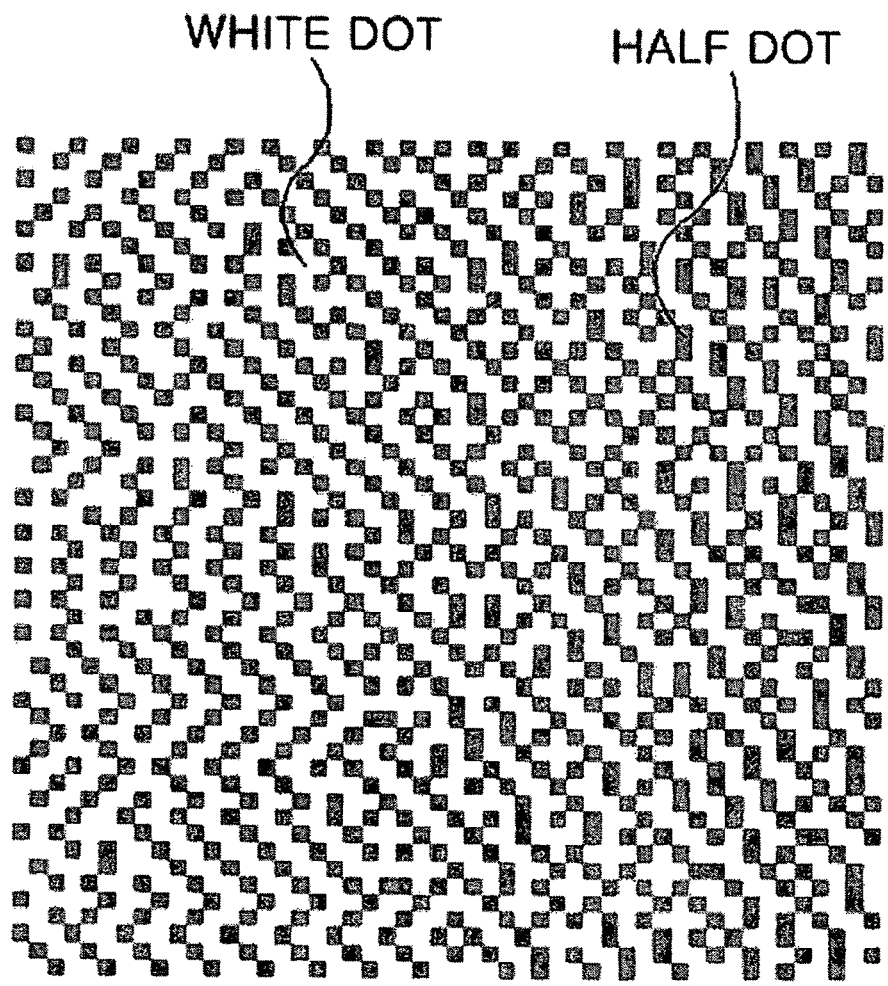
Figure 3D:
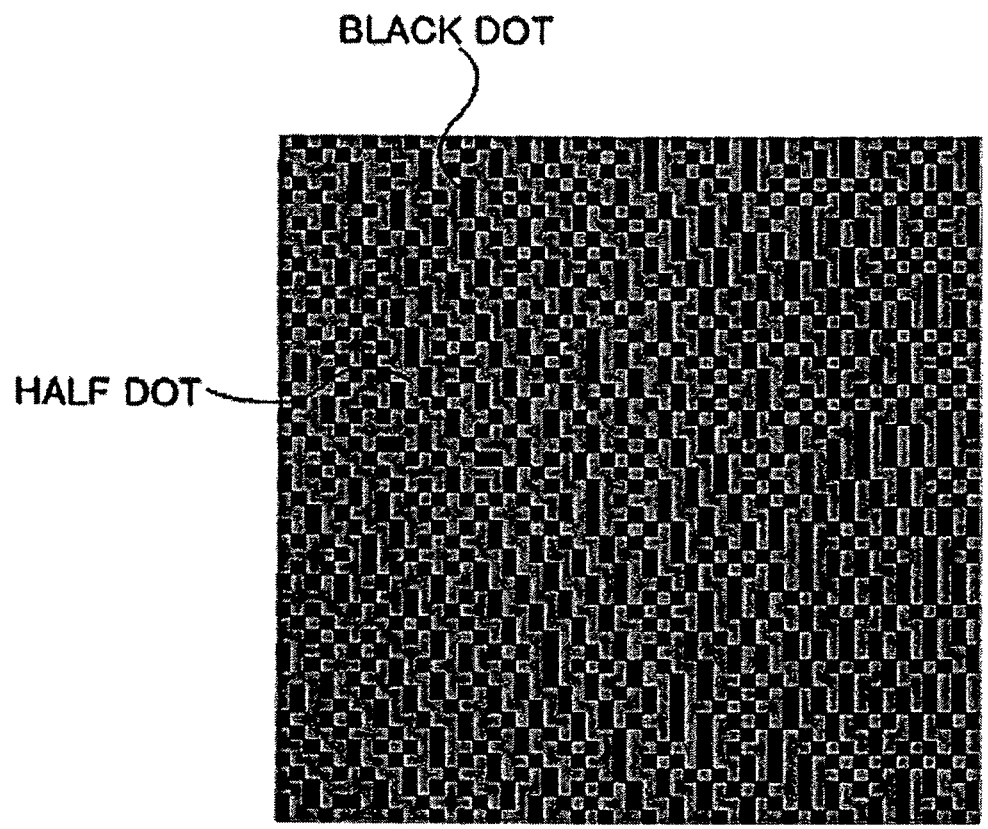

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 4:
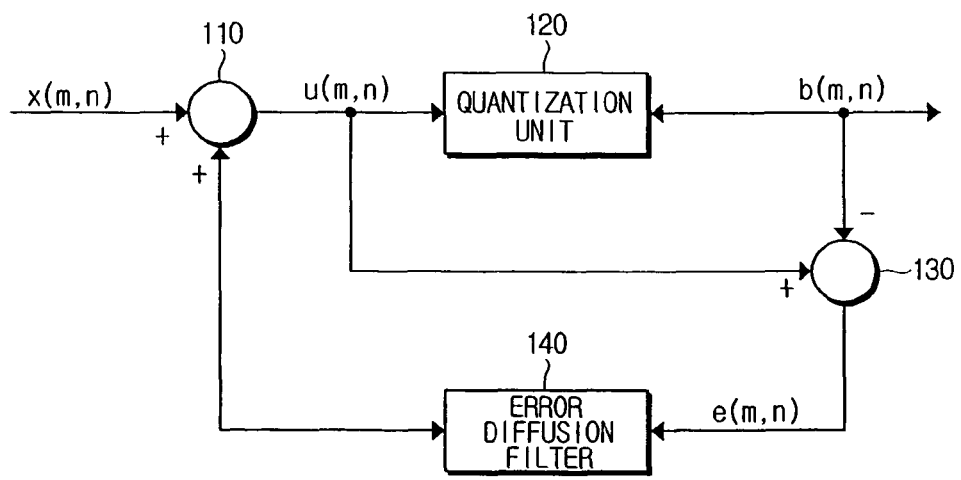
FIG. 4 is a block diagram illustrating an error diffusion processing apparatus according to an embodiment of the present general inventive concept.

FIG. 4 is a block diagram illustrating an error diffusion processing apparatus according to an embodiment of the present general inventive concept.

The error diffusion processing apparatus comprises an adding unit 110, a quantization unit 120, a subtraction unit 130, and an error diffusion filter 140.

The adding unit 110 adds an input grayscale value 'x(m, n)' of an input pixel (m, n) to an output value from the error diffusion filter 140 and thereby obtains a modified input grayscale value 'u(m, n)'. The modified input grayscale value 'u(m, n)' is provided to the quantization unit 120.

The quantization unit 120 quantizes the modified input grayscale value 'u(m, n)' based on a determination of whether the modified input grayscale value 'u(m, n)' belongs to one of the areas divided by a plurality of thresholds, and thereby outputs a binary grayscale value 'b (m, n)' of the pixel (m, n). The areas includes at least one shadow area, which is darker than a median grayscale value, and the modified input grayscale value 'u(m, n)' is quantized to a predetermined grayscale value which is brighter than the median grayscale value in a predetermined method. A pixel may include at least one of a white dot, a black dot, and a halftone dot.

For example, the quantization unit 120 quantizes the modified grayscale value 'u (m, n)' and outputs the binary grayscale value 'b(m, n)' using the following equation 2.

$$e(m, n) = u(m, n) - b(m, n)$$ [Equation 2]

$$u(m, n) = x(m, n) + \sum_{(k,l) \in R} e(m-k, n-1) \times w(k, l)$$

-continued if $b_1 < u(m, n) \le b_0$, $$b(m, n) = \begin{cases} b_0 & \text{if } u(m, n) \ge T_1 \\ b_1 & \text{else} \end{cases}$$

if $b_2 < u(m, n) \le b_1$, $$b(m, n) = \begin{cases} b_1 & \text{if } u(m, n) \ge T_2 \\ b_2 & \text{else} \end{cases}$$

...

if $b_{j-1} < u(m, n) \le b_{j-2}$, $$b(m, n) = \begin{cases} B, & \text{if } u(m, n) \ge T_{j-1} \\ b_{j-2}, & \text{else if } u(m, n) \ge T_j \\ b_{j-1}, & \text{else} \end{cases}$$

$b_{j-1} < T_j < T_{j-1} <$ $b_{j-2} \ldots b_2 < T_2 < b_1 < T_1 < b_0$, $b_0 = 255$, $b_{j-1} = 0$ where e(m, n) denotes an error between an input grayscale value and a binary grayscale value of a pixel (m, n), and x(m, n) is the input grayscale value of the pixel (m, n). u(m, n) denotes a modified input grayscale value of the pixel (m, n), R denotes an area in which an error diffusion coefficient is defined, and w(k, l) denotes the error diffusion coefficient. b(m, n) denotes the binary grayscale value of the pixel (m, n) and T denotes a threshold. $b_0$ denotes the brightest grayscale value, $b_{j-1}$ denotes the darkest grayscale value, and B denotes a predetermined grayscale value which is brighter than a median grayscale value.

If the modified input grayscale value u(m, n) falls within a range from $T_{j-1}$ and $b_{j-2}$ which is darker than the median grayscale value, the modified input grayscale value u(m, n) is converted to the predetermined grayscale value 'B' which is brighter than the median grayscale value. The predetermined grayscale value 'B' is set to '255'($b_o$) to solve a problem in that the above-described modified input grayscale value u(m, n) is not expressed with the median grayscale level due to the overlapping of laser beams applied to neighboring pixels but expressed by the nearly black level of grayscale (0).

For example, a grayscale range is divided into 4 by three thresholds '64', '128' and '192'. The grayscale range may include a first grayscale range 0~63, a second grayscale range 64-127, a third grayscale range 128-191, and a fourth grayscale range 192-255. If the modified input grayscale value 'u(m, n)' is a value between 64 and 128, the quantization unit 120 outputs a binary grayscale value '255'. However, the present general inventive concept is not limited thereto. The number of thresholds and the range based on which the input grayscale value u(m, n) is converted to a grayscale value which is brighter than the median grayscale value are variable according to an input image and a characteristic of an image forming apparatus.

According to present embodiment, the modified input grayscale value 'u(m, n)' of the at least one shadow area which is darker than the median grayscale value may be quantized to a grayscale value which is brighter than the median grayscale value.

Figure 5A:
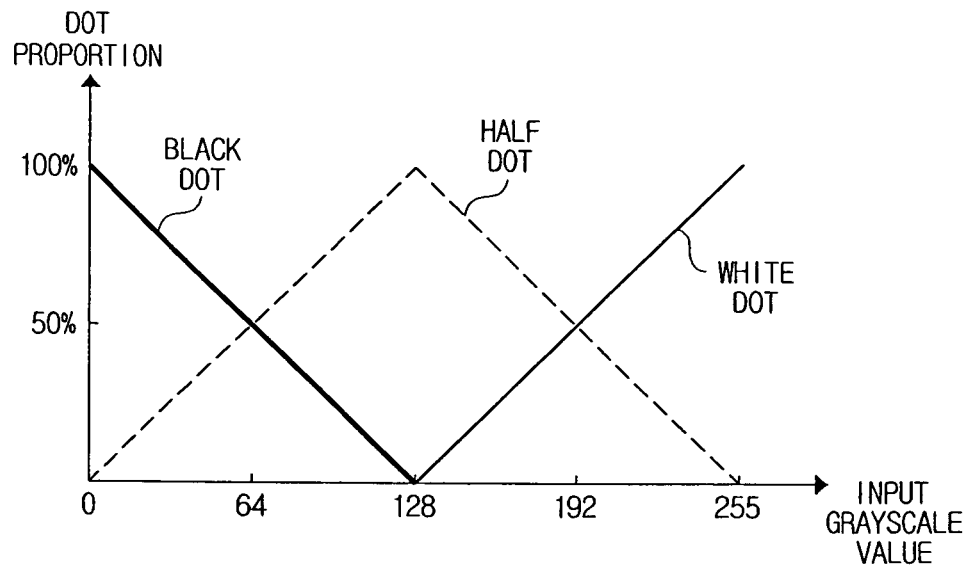
FIG. 5A and 5B are graphs each illustrating a relationship between an input grayscale value and a proportion of dot when a continuous-tone input image ranging from '255' to '0' in grayscale is processed to a 3-level image according to a conventional error diffusion method and an error diffusion method of the present general inventive concept, respectively.
Figure 5B:
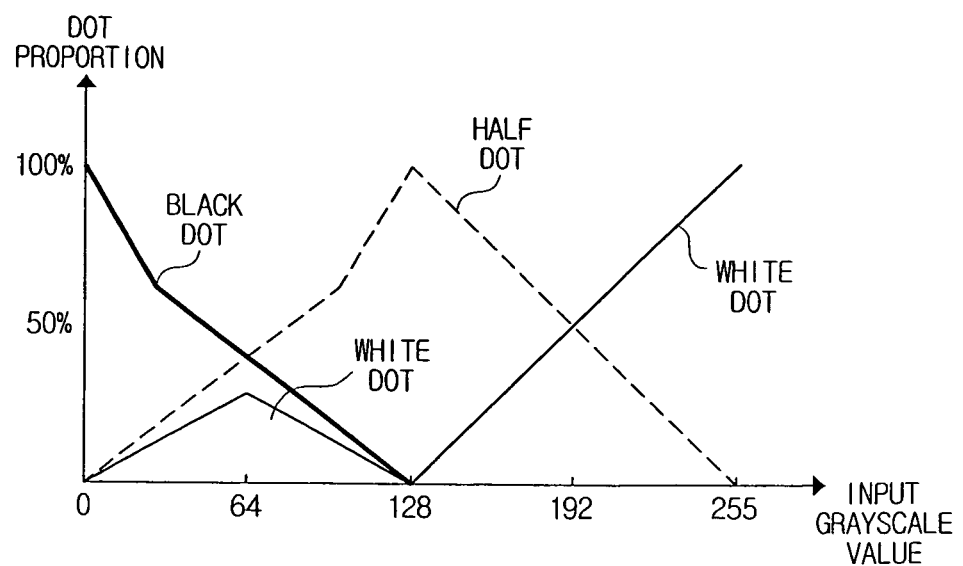

FIGS. 5A and 5B are graphs illustrating a relationship between an input grayscale value and a dot ratio when a continuous-tone input image ranging from '255' to '0' is processed to a 3-level image according to an error diffusion method. FIG. 5 is a graph illustrating a relationship between an input grayscale value and a proportion of dot corresponding to each input grayscale value when an input image is processed according to a conventional error diffusion method using the equation 1. FIG. 5B is a graph illustrating a relationship between an input grayscale value and a proportion of dot corresponding to each input grayscale value when an input image is processed according to the error diffusion method of the present general inventive concept using the equation 2.

Referring to FIGS. 5A and 5B, a horizontal axis represents the input grayscale value of the input image, and a vertical axis represents a dot proportion corresponding to each input grayscale value of the input image. A thick solid line shows a proportion of a black dot, and a thin solid line shows a proportion of white dot. A dotted line shows a proportion of a half dot.

According to the conventional error diffusion method, if an area has input grayscale values from '0' to '128', the area is expressed only by a combination of the black dot and the half dot as illustrated in FIG. 5A. For example, in an area having the input grayscale value 64, 50% of the area is converted to black dot corresponding to a grayscale value 0, the remaining 50% is converted to half dot corresponding to a grayscale value '128'. Accordingly, in the area corresponding to the grayscale value '64', the black dot and the half dot are combined in a ratio of 1:1, and the area is not expressed in a grayscale value 64 but in a nearly grayscale 0 due to the overlapping of the toner particles.

However, in the error diffusion method according to the present embodiment, the white dot is generated in the shadow area which has input grayscale values from '0' to '128'. Accordingly, in the shadow area darker than the median grayscale value, some of input grayscale values are forcedly processed such that they are converted to white dot. By diffusing errors generated during this process to neighboring pixels, a problem in that that an undesirable shadow area appears due the overlapping of toner particles can be solved, and an image similar to an input image can be obtained. That is, the pixel of the image can be expressed with a combination of at least one white dot, at least one black dot, and at least one half dot in the areas having the ranges of 0-63 and 64-127, and another combination of at least one white dot and at least one half dot in the areas having the ranges of 128-191 and 192-255.

The subtraction unit 130 obtains the error 'e(m, n)' from the modified input grayscale value 'u(m, n)' and the binary grayscale value 'b(m, n)' of the pixel (m, n), and provides the error 'e(m, n)' to the error diffusion filter 140.

The error diffusion filter 140 distributes the error 'e(m, n)' output from the subtraction unit 130 to neighboring pixels of the pixel (m, n) according to a predetermined error diffusion coefficient. The error diffusion filter 140 may be a Floyd-Steinberg error filter as shown in FIG. 6.

Figure 6:
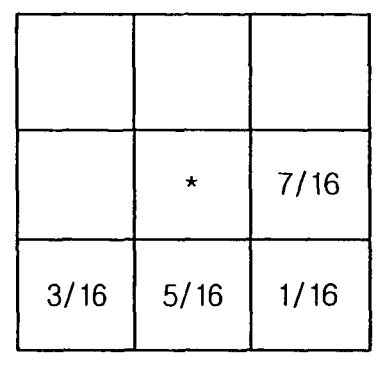

Referring to FIGS. 4 through 6, a mark '*' indicates a pixel which is transformed to have a binary grayscale value by the quantization unit 120. The error diffusion filter 140 distributes an error which is occurred during the calculation of the binary grayscale value of the pixel * to a right pixel, a lower pixel, a lower left pixel, and a lower right pixel according to error diffusion coefficients 7/16, 5/16, 3/16, and 1/16, respectively.

Figure 7:
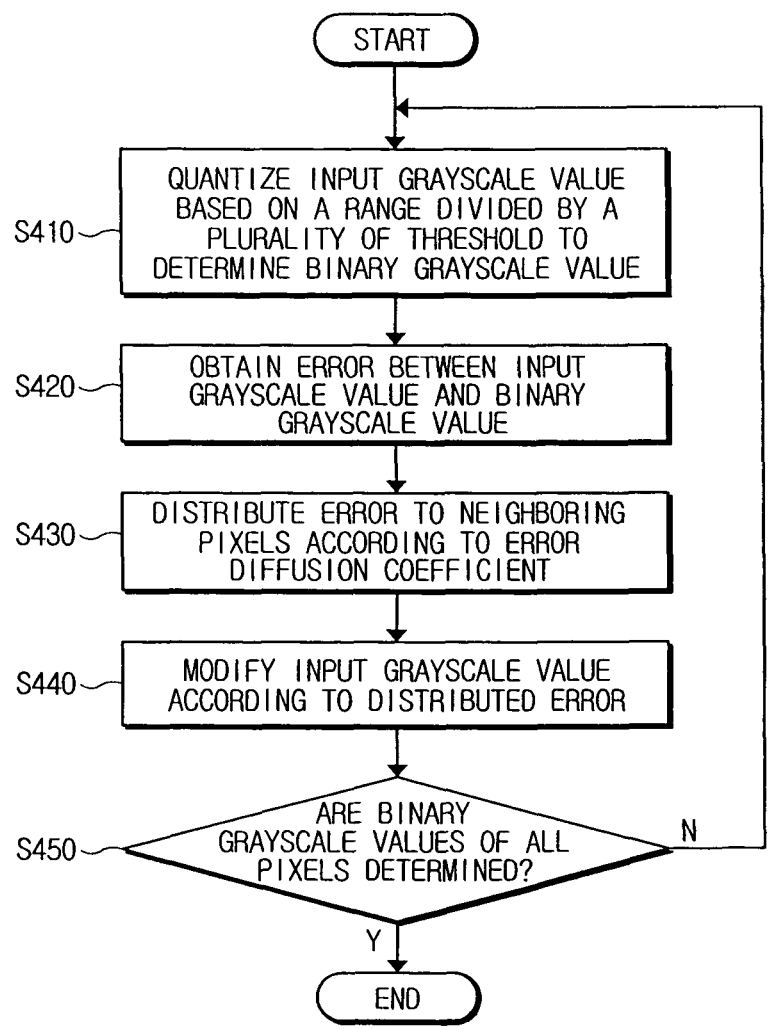
FIG. 7 is a flowchart illustrating an error diffusion processing method according to an embodiment of the present general inventive concept.

FIG. 7 is a flowchart illustrating an error diffusion processing method according to an embodiment of the present general inventive concept.

Referring to FIGS. 4 and 7, the quantization unit 120 quantizes an input grayscale value 'u(m, n)' output from the adding unit 110 based on a range divided by a plurality of thresholds and thereby outputs a binary grayscale value 'b(m, n) of a pixel (m, n). Herein, with respect to at least one shadow area, which is darker than a median grayscale value, a modified input grayscale value 'u(m, n)' is quantized to a grayscale value which is brighter than the median grayscale value and is output as the binary grayscale value 'b(m, n)' of the pixel (m, n) at operation S410. This operation is performed according to an algorithm based on the equation 2.

Next, the subtraction unit 130 obtains an error 'e(m, n)' from the modified input grayscale value 'u(m, n) and the binary grayscale value 'b(m, n)' output from the quantization unit 120 and provides the error 'e(m, n)' to the error diffusion filter 140 at operation S420.

The error diffusion filter 140 distributes the error 'e(m, n)' output from the subtraction unit 130 to neighboring pixels of the pixel (m, n) according to a predetermined error diffusion coefficient at operation S430. Here, the error diffusion filter 140 may be the Floyd-Steinberg error filter as shown in FIG. 6. The adding unit 110 modifies the input grayscale value by adding the input grayscale value to the output value from the error diffusion filter 140 at operation S440. Finally, the error diffusion processing apparatus 100 repeats from the operations S410 to S430 until the binary grayscale value of all input pixels are determined at operation S450.

According to the present embodiment, in the error diffusion processing method and apparatus, some of the input grayscale values of the input image, which fall within the darker range than the median grayscale value, is forcedly processed such that the input grayscale values are converted to a white dot, and an error occurred during this process is distributed to the neighboring pixels. Therefore, an undesirable shadow area appearing due to the overlapping of toner particles can be prevented so that an image similar to an input image in grayscale level can be obtained.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An error diffusion processing method, comprising:

adding an input grayscale value x(m, n) of an input pixel (m, n) of an input image to an error diffusion filtered value and outputting a modified input grayscale value u(m, n);

quantizing the modified input grayscale value u(m, n) by using a determination of whether the modified input grayscale value u(m, n) belongs to one of areas divided by a plurality of thresholds, the areas including at least one shadow area which is darker than a median grayscale value, the modified grayscale value determined to be in the at least one shadow area being quantized to a predetermined grayscale value which is brighter than the median grayscale value so as to determine a binary grayscale value of the pixel (m, n);

obtaining an error with a subtracting unit from the modified input grayscale value and the binary grayscale value of the pixel (m, n); and distributing the error to neighboring pixels of the pixel (m, n) with an error diffusion filter according to a predetermined error diffusion coefficient corresponding to the error, and to modify input grayscale values of the neighboring pixels, wherein the obtaining the error and the distributing the error is by using the predetermined grayscale value which is brighter than the median grayscale value.

2. The error diffusion processing method as claimed in claim 1, wherein the quantizing of the input grayscale value comprises quantizing using the following equations;

$$e(m, n) = u(m, n) - b(m, n)$$

$$u(m, n) = x(m, n) + \sum_{(k,l) \in R} e(m-k, n-1) \times w(k, l)$$

if $b_1 < u(m, n) \le b_0$, $$b(m, n) = \begin{cases} b_0 & \text{if } u(m, n) \ge T_1 \\ b_1 & \text{else} \end{cases}$$

if $b_2 < u(m, n) \le b_1$, $$b(m, n) = \begin{cases} b_1 & \text{if } u(m, n) \ge T_2 \\ b_2 & \text{else} \end{cases}$$

...

if $b_{j-1} < u(m, n) \le b_{j-2}$, $$b(m, n) = \begin{cases} B, & \text{if } u(m, n) \ge T_{j-1} \\ b_{j-2}, & \text{else if } u(m, n) \ge T_j \\ b_{j-1}, & \text{else} \end{cases}$$

$$b_{j-1} < T_j < T_{j-1} < b_{j-2} \ldots b_2 < T_2 < b_1 < T_1 < b_0,$$

$$b_0 = 255,$$

$$b_{j-1} = 0$$

where e(m, n) denotes an error between an input grayscale value and a binary grayscale value of a pixel (m, n), x(m, n) denotes the input grayscale value of the pixel (m, n), u(m, n) denotes a modified input grayscale value of the pixel (m, n), R denotes an area in which an error diffusion coefficient is defined, w (k, I) denotes an error diffusion coefficient, b (m, n) denotes the binary grayscale value of the pixel (m, n), T denotes a threshold, $b_o$ denotes the brightest grayscale value, $b_{,j-1}$ denotes the darkest grayscale value, and B denotes a predetermined grayscale value which is brighter than a median grayscale value.

3. The error diffusion processing method as claimed in claim 2, wherein the predetermined grayscale value is the brightest grayscale value.

4. The error diffusion processing method as claimed in claim 1, wherein the predetermined error diffusion coefficient is determined by a Floyd-Steinberg error filter.

5. The error diffusion processing method as claimed in claim 1, wherein the number of thresholds is at least 3.

6. An error diffusion processing apparatus comprising:
an error diffusion filter;
an adding unit to add an input grayscale value x(m, n) of an input pixel (m, n) of an input image to an error diffusion filtered value and to output a modified input grayscale value u(m, n);
an quantization unit to quantize the modified input grayscale value by using a determination of whether the modified input grayscale value u(m, n) belongs to one of areas divided by a plurality of thresholds, the areas including at least one shadow area which is darker than a median grayscale value, the modified grayscale value determined to be in the at least one shadow area being quantized to a predetermined grayscale value which is brighter than the median grayscale value so as to determine a binary grayscale value;
a subtracting unit to obtain an error between the modified input grayscale value and the binary grayscale value of the pixel (m, n); and
an error diffusion filter to distribute the error obtained by the subtracting unit to neighboring pixels of the pixel (m, n) according to a predetermined error diffusion coefficient corresponding to the error to modify input grayscale values of the neighboring pixels,
wherein the subtracting unit and the error diffusion filter obtain and distribute the error by using the predetermined grayscale value which is brighter than the median grayscale value.

7. The error diffusion processing apparatus as claimed in claim 6, wherein the quantization unit quantizes using the following equations;

$$e(m, n) = u(m, n) - b(m, n)$$

$$u(m, n) = x(m, n) + \sum_{(k,l) \in R} e(m-k, n-1) \times w(k, l)$$

if $b_1 < u(m, n) \le b_0$, $$b(m, n) = \begin{cases} b_0 & \text{if } u(m, n) \ge T_1 \\ b_1 & \text{else} \end{cases}$$

if $b_2 < u(m, n) \le b_1$, $$b(m, n) = \begin{cases} b_1 & \text{if } u(m, n) \ge T_2 \\ b_2 & \text{else} \end{cases}$$

...

if $b_{j-1} < u(m, n) \le b_{j-2}$, $$b(m, n) = \begin{cases} B, & \text{if } u(m, n) \ge T_{j-1} \\ b_{j-2}, & \text{else if } u(m, n) \ge T_j \\ b_{j-1}, & \text{else} \end{cases}$$

$$b_{j-1} < T_j < T_{j-1} < b_{j-2} \ldots b_2 < T_2 < b_1 < T_1 < b_0,$$

$$b_0 = 255,$$

$$b_{j-1} = 0$$

where e(m, n) denotes an error between an input grayscale value and a binary grayscale value of a pixel (m, n), x(m, n) denotes the input grayscale value of the pixel (m, n), u (m, n) denotes a modified input grayscale value of the pixel (m, n), R denotes an area in which an error diffusion coefficient is defined, w (k, I) denotes an error diffusion coefficient, b (m, n) denotes the binary grayscale value of the pixel (m, n), T denotes a threshold, $b_o$ denotes a brightest grayscale value, $b_{j-1}$ denotes a darkest grayscale value, and B denotes a predetermined grayscale value which is brighter than the median grayscale value.

8. The error diffusion processing apparatus as claimed in claim 7, wherein the predetermined grayscale value is the brightest grayscale value.

9. The error diffusion processing method as claimed in claim 6, wherein the error diffusion filter is a Floyd-Steinberg error filter.

10. The error diffusion processing method as claimed in claim 6, wherein the number of thresholds is at least 3.

11. An image forming apparatus comprising:
a signal source to generate an image signal having a first pixel and a second pixel disposed adjacent to the first pixel; and an error diffusion processing apparatus having an quantization unit to receive a first input grayscale value of the first pixel, to determine whether the received input grayscale value belongs to one of the areas divided by a plurality of thresholds corresponding to the entire grayscale values, and to quantize the received input grayscale value according to the determination to obtain a binary grayscale value representing that the pixel is expressed with a combination of a first number of one or more white dots, a second number of one or more black dots, and a third number of one or more half dots, wherein the quantization unit quantizes a modified input grayscale value by using a determination of whether the modified input grayscale value u(m, n) belongs to one of areas divided by a plurality of thresholds, the areas including at least one shadow area which is darker than a median grayscale value, the quantization unit quantizes the modified input grayscale value determined to be in the at least one shadow area to a predetermined grayscale value which is brighter than the median grayscale value so as to determine a binary grayscale value, and error corresponding to the quantization of the part is distributed to neighboring pixels of an input pixel according to a predetermined error diffusion coefficient corresponding to the error, and wherein the quantization unit obtains and distributes the error by using the predetermined grayscale value which is brighter than the median grayscale value.

12. The image forming apparatus as claimed in claim 11, wherein the error diffusion processing apparatus further comprises:

an adding unit to add an error signal to a second input grayscale value of the second pixel to generate a modified input grayscale value, wherein the quantization unit receives the modified grayscale value of the second pixel and quantizes the received modified grayscale value to obtain a second binary grayscale value of the second pixel representing that the second pixel is expressed with a combination of a fourth number of one or more white dots, a fifth number of one or more black dots, and a sixth number of one or more half dots.

13. The image forming apparatus as claimed in claim 12, wherein the error diffusion processing apparatus further comprises:

a subtraction unit to generate an error from the modified grayscale value of the second pixel and the binary grayscale value of the first pixel; and an error diffusion filter to generate the error signal from the error of the subtraction unit using an error diffusion coefficient.

14. The image forming apparatus as claimed in claim 11, wherein the first and second pixels are formed on a sheet of paper using the combination of the first number of one or more white dots, the second number of one or more black dots, and the third number of one or more half dots.

15. The image forming apparatus as claimed in claim 11, wherein the first number of the white dots is not zero.

16. An error diffusion processing method, comprising:

receiving an input grayscale value of a pixel of an input image;

determining whether the received input grayscale value belongs to one of the areas divided by a plurality of thresholds corresponding to the entire grayscale values; and by using a determination whether a modified input grayscale value u(m, n) belongs to one of areas divided by a plurality of thresholds, the areas including at least one shadow area which is darker than a median grayscale value, quantizing the modified input grayscale value determined to be in the at least one shadow area being quantized to a predetermined grayscale value which is brighter than the median grayscale value to determine a binary grayscale value, distributing an error corresponding to the quantization of the part to neighboring pixels of an input pixel according to a predetermined error diffusion coefficient corresponding to the error, wherein the distributing the error distributes the error by using the predetermined grayscale value which is brighter than the median grayscale value.

* * * * *